A. L. AUSTIN.
RESILIENT TIRE FILLER.
APPLICATION FILED JUNE 22, 1917.
1,278,416.
Patented Sept. 10, 1918.
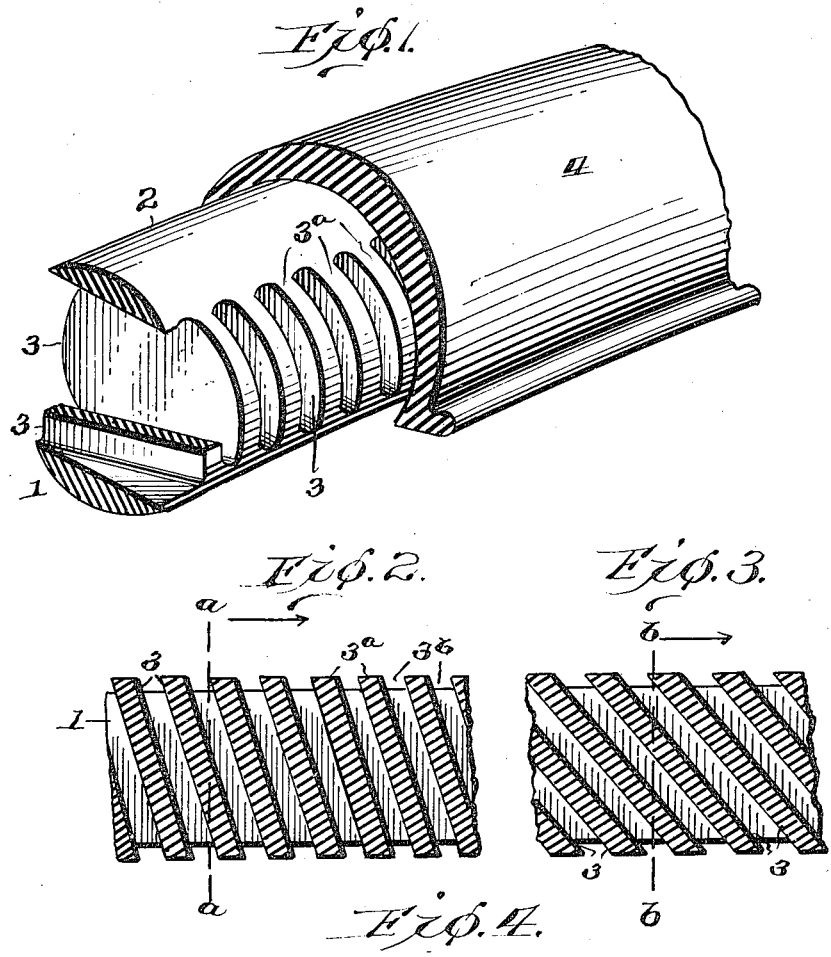
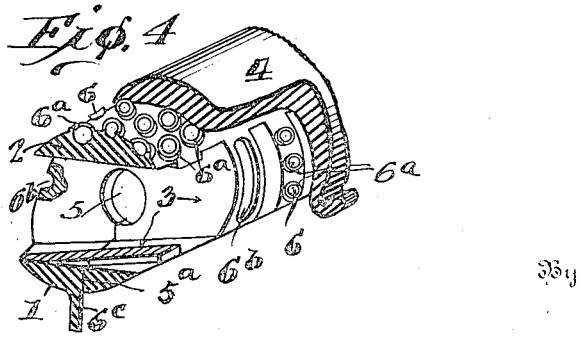
Inventor
Albert L. Austin
By
Obed S. Billman Attorney

UNITED STATES PATENT OFFICE.

ALBERT L. AUSTIN, OF CLEVELAND, OHIO.

RESILIENT TIRE-FILLER.

1,278,416.	Specification of Letters Patent.	Patented Sept. 10, 1918.

Application filed June 22, 1917. Serial No. 176,311.

*To all whom it may concern:*

Be it known that I, ALBERT L. AUSTIN, a citizen of the United States, residing at Cleveland, in the county of Cuyahoga and State of Ohio, have invented certain new and useful Improvements in Resilient Tire-Fillers, of which the following is a specification.

My invention relates to improvements in resilient tire fillers or cores designed to be inserted in the ordinary tire casing in lieu of the ordinary inner tube with its chamber of compressed air and being designed to afford the requisite resiliency to the tire as a whole for taking up shocks and obstructions similar to the ordinary pneumatic tire.

The primary object of the invention is to provide a generally improved tire filler of this class which will be exceedingly simple in construction, cheap of manufacture, and efficient in use.

A further object is the provision of an elastic non-inflatable filler or core of suitable material such as rubber, or the like, made up of spaced relatively movable connected ring and web members forming the tread and heel portions and the side portions, respectively, of the tire filler.

With the above mentioned and other ends in view, the invention consists in the novel construction, arrangement, and combination of parts, hereinafter described, illustrated in some of its embodiments in the accompanying drawings, and particularly pointed out in the appended claims.

Referring to the drawings, forming a part of this specification, Figure 1, is a perspective view of a section of an ordinary tire casing equipped with a section of tire filler or core constructed in accordance with this invention.

Fig. 2, a central horizontal sectional view of the filler or core removed.

Fig. 3, a similar view of a modified form of same.

Fig. 4, a perspective view of a section of a tire casing and filler showing a further modified form of same.

Similar numerals of reference designate like parts throughout all of the figures of the drawings.

The improved resilient filler comprises a ring of suitable molded resilient material, preferably of endless ring form of such size and form in cross section as to fill the interior of the tire casing with which the filler or core is to be employed when such casing is applied to the wheel.

The improved tire filler comprises an elastic non-inflatable ring or body, preferably, of an endless ring of molded rubber, and consisting of inner and outer ring members 1, and 2, respectively, connected by a series or plurality of radially extending transversely inclined spaced web members 3. The inner and outer members 1, and 2, form what may be termed "heel and tread members," within the corresponding portions of the tire casing 4, said members 1, and 2, in the present instance, being of segmental form in cross or transverse section while the spaced web members are of disk shape forming curved sides 3ª, concentric to the longitudinal center or axis of the tire filler.

The spaced web members form intervening air spaces 3ᵇ, and are adapted to afford the requisite resiliency to the tire as a whole to take up obstructions and shocks similar to the ordinary pneumatic tire and are also adapted to receive and take care of the lateral motions and strains on the tire or casing as well as provide the requisite resiliency between the various parts in supporting the superposed load on the tire body.

The transversely inclined spaced supporting and connecting members 3, are also preferably arranged in radially extending planes as shown in Figs. 1, to 3, inclusive, of the drawings, so as to directly receive an edgewise compression at the contact portion of the tread of the tire with the subjacent roadway, and as a means of equally or uniformly distributing the resistance and resiliency offered by such spaced web members 3, the latter are preferably so arranged that the line of compression, as indicated at *a—a* in Fig. 2, of the drawings, and at *b—b* in Fig. 3, of the drawings, will always rest upon or include one or more of the web members 3, and it will be obvious upon reference to Fig. 2, of the drawings, that as the tire is moved in the direction indicated by the arrow and the line of compression is at *a—a* or at the center of one of the web members 3, and is being moved forwardly by the rotation of the tire, and the line of compression is being moved over the last half or portion of one web member it is being carried over the initial and first portion of the next or adjacent web member so that a uniform resiliency is constantly given to the tire as a whole by the tire filler during its travel in actual service.

In the modified form of tire filler shown in Fig. 3, of the drawings, the same corresponds in all respects to that shown in Figs. 1, and 2, in the drawings except that the supporting and connecting web members 3, extend at a more pronounced angle transversely, thereby forming disk-shaped web members of a more elongated form.

In the form of tire filler shown in Fig. 4, of the drawings, the web members 3, are not only transversely inclined but are provided with a central longitudinally extending cored opening 5, and the inner or heel portion 1, is longitudinally split as at 5ª, for the removal of the core member from the cored opening 5, in the manufacture of this form of tire filler, and as a means of preventing the creeping or circumferential movement of the improved tire filler relative to the tire casing 4, the inner and outer members 1, and 2, and the spaced web members 3, are provided with suitable anti-creeping means, consisting in the present instance, of vacuum or suction creating cups 6, the latter being preferably provided with annular raised or flanged portions 6ª, and vacuum or suction creating openings are arranged in elongated form as shown at 6ᵇ, in the alternate web members 3, and the inner portion of the improved filler is provided with an anchor stem 6ᶜ, adapted to extend through the usual opening in the wheel felly in lieu of the ordinary valve stem used in connection with inner or air tubes now commonly employed.

From the foregoing description, taken in connection with the accompanying drawings, the operation and advantages of my invention will be readily understood.

Having thus described some of the embodiments of my invention, what I claim and desire to secure by Letters Patent, is—

1. A tire filler, comprising heel and tread members and transversely inclined spaced web members integral therewith, said web members being provided with a central cored opening, and said heel and web members being provided with a circumferentially extending split communicating with said cored opening.

2. A tire filler, comprising inner and outer ring members of segmental form in cross section, and interposed transversely inclined spaced parallel extending disk-shaped connecting members, the latter and said inner ring member being provided with a circumferential split terminating in a central cored opening within said connecting members.

3. A tire filler, comprising an integral ring made up of radially and longitudinally spaced parallel extending resilient ring and disk members, respectively, said disk members being provided with a central longitudinally extending cored opening and having a median split communicating with the latter.

4. A tire filler, comprising spaced ring members of segmental form in cross section, and resilient connecting spaced disk-shaped members forming curved open sides concentrically arranged and provided with a central cored opening, said disk-shaped members and one of said ring members being provided with a median circumferential split communicating with said cored opening.

5. A tire filler, comprising inner and outer resilient ring members, and radially extending transversely inclined spaced parallel extending resilient connecting members, the surfaces of the latter and of said ring members being concentrically arranged, said resilient connecting members being arranged in such relation to each other and to said outer ring member as to uniformly receive the line of tread compression on a plurality of said resilient connecting members.

6. A tire filler, comprising spaced heel and tread rings connected by means of radially extending transversely inclined resilient disk members receiving the line of tread compression on a plurality of same, the surfaces of said ring and disk members being concentrically arranged.

7. A tire filler, comprising resilient parallel extending spaced heel and tread rings connected by transversely inclined elongated resilient disk members spaced apart and arranged in parallel relation to each other to uniformly receive the line of tread compression on a plurality of same, said rings and disk members forming curved surfaces concentric to the longitudinal center of said tire filler.

8. A tire filler, comprising an elastic non-inflatable ring, consisting of spaced relatively movable parallel extending connected ring and web members forming the tread and side portions, respectively, of said tire filler, said web members being of elongated disk-shape and transversely inclined to uniformly receive the line of tread compression on a plurality of same at all times, the outer surfaces of said ring and web members being curved from a common longitudinal center.

9. A filler for tire casings, comprising an elastic non-inflatable body made up of relatively movable inner and outer ring members and spaced diagonally disposed resilient disk-shaped web members having curved sides projecting beyond the sides of said ring members, said web members being also arranged in such proximity and relation to said outer ring member as to uniformly receive the line of tread compression on a plurality of same.

10. A tire filler, comprising an elastic non-inflatable ring consisting of spaced relatively movable connected ring and web members forming the tread and side portions, respectively, of said tire filler, said web members being closely arranged and transversely inclined to uniformly receive the line of compression on a plurality of the same at the tread of the tire.

11. A filler for tire casings, comprising an elastic non-inflatable body made up of inner and outer ring members connected by spaced transversely inclined closely arranged parallel extending disk-shaped web members, whereby the line of tread compression while passing from one will be passing upon an adjacent web member.

In testimony whereof I have affixed my signature in the presence of two witnesses.

ALBERT L. AUSTIN.

Witnesses:
WILLIAM H. HILL,
O. C. BILLMAN.